3,136,628
PROCESS FOR PRODUCING METALS

James H. Downing, Buffalo, and Benjamin J. Wilson, Kenmore, N.Y., assignors to Union Carbide Corporation, a corporation of New York
No Drawing. Filed Jan. 19, 1961, Ser. No. 83,625
8 Claims. (Cl. 75—63)

The present invention relates to a process for producing metals by vaporization techniques from silicon containing materials.

It is an object of the present invention to provide a process for producing substantially pure metals by vaporization.

It is another object to provide a process for producing substantially pure metals by vaporization at increased rates of metal production and high metal yields.

It is a further object of the present invention to provide a process for vaporizing metals directly from the solid state at temperatures well in excess of the melting point without substantial fusion of the metal before vaporization.

The process which satisfies the above-mentioned objects comprises admixing an amount of particulate solid state carbon and at least one particulate solid state starting material selected from the group consisting of silicides and silicon alloys of at least one element selected from the group consisting of manganese, aluminum and calcium; said carbon being present at least in that amount required to stoichiometrically combine with the silicon in the starting material to form silicon carbide; charging the solid state admixture into a vacuum furnace; evacuating substantially all the gas reactive with the selected metal and heating the admixture in vacuo to a temperature and for a time sufficient to form silicon carbide and produce a metal vapor of the selected metal at a pressure in excess of the ambient pressure within the vacuum furnace and condensing the metal vapors to recover pure metals.

The metals amenable for treatment in the present process are manganese, aluminum and calcium. All these metals are capable of formation of silicides and silicon alloys of the metals amenable for use herein vary widely but all methods of preparation are considered standard metallurgical practice.

The following table sets forth the nominal compositions of several silicon alloys containing the metals of the present process.

TABLE I

| Alloy | Element, percent by weight | | | | | |
|---|---|---|---|---|---|---|
| | C | Mn | Fe | Al | Ca | Si |
| Silicomanganese | 1.5 | 65-68 | bal. | | | 18-20 |
| Aluminum-silicon | | | | 50 | | 50 |
| Calcium-silicon | | | 1.5-3 | | 30-33 | 60-65 |

The silicides of calcium, aluminum, and manganese contain the following percents of silicon:

Silicide: Wt. percent Si
Al ------------------------------------- 50
Mn ------------------------------------- 12-20
Ca ------------------------------------- 60-65

Particulate starting materials are required and a particle size of about 10 mesh x down may be used.

Although it is not essential to the operability of the process of the invention, the metal silicide or metal-silicon alloy is preferably reduced in particle size prior to mixing with particulate carbon and charging to the reactor for thermal decomposition.

The amount of carbon utilized in the present process must be at least that amount required to combine stoichiometrically with all the silicon in the starting material to form silicon carbide. It has been found that as the iron in the starting materials is increased a corresponding increase in carbon up to about 25 percent in excess of that stoichiometric amount required to convert all the silicon to silicon carbide is desired.

Less than the stoichiometric amount of carbon in the starting material required to convert all the silicon in the starting mixture to silicon carbide allows liquification of the metal-silicon alloy which is detrimental to the rate of evaporation.

Any suitable vacuum furnace may be utilized in the present process.

Substantially all the gas which is reactive with the metal vapor produced must be evacuated from the furnace after charging and before heating is commenced. This is accomplished in particular to avoid production of contaminated metals as well as an aid in establishing subatmospheric conditions in the furnace. It is to be noted that the term "vacuum" and the phrase "in vacuo" are utilized throughout this disclosure and in the claims to indicate pressure below one standard atmosphere. Reference to specific vacuum pressures throughout this disclosure and in the claims to indicate pressure below one standard atmosphere will be denoted by millimeters of mercury (e.g. mm. of Hg).

One of the major advantages of the present process is that it permits heating the mixture to temperatures considerably in excess of the melting point of the recoverable metal constituent in the mixture without massive formation of the liquid phase of the metal. In this manner maximum vaporization rates are maintained without loss of rate due to the formation of substantial amounts of liquid. It is generally found that the mixture in its solid state is heated at as fast a rate of temperature rise as possible, without massive fusion, to temperatures sufficiently high to produce rapid vaporization of the metal from the mixture. The temperature is maintained at a sufficiently high level to maintain a vapor of metal at a pressure in excess of the ambient pressure in the vacuum furnace. Note that the metal vapor pressure must be in excess of the ambient pressure of the furnace to enable an artisan to secure high rates and yields of the metal sought. The highest possible temperatures are preferred up to the temperature immediately below that level which may cause conversion of the metal being vaporized and refractory to a liquid pool.

It is readily apparent that the rate of metal production, and to some extent the yield of the metal sought, is largely governed by the difference in the pressure of the atmosphere within the furnace and the vapor pressure of the metal being vaporized. Consequently extremely low vacuums are most desirable in the present process and, indeed, as low a pressure within the furnace as can be maintained by the equipment should be utilized.

Though the present process is desirably conducted in the above manner, reasonable rates of reaction and substantial yields of metal can be achieved where there is less difference between the vapor pressure of the metal and the pressure of the atmosphere within the furnace. This results from the amenability of the mixture of the present process to treatment at temperatures far in excess of the melting point of the particular metallic constituent sought to be recovered from the mixture.

Condensation may be carried out in any one of a variety of known condensers. Condensation may be conducted in vacuum or in inert gas atmospheres.

Preferably, vaporized contaminants, such as oxides, carbides, and nitrides of the selected metals resulting from similar impurities in the primary source are removed by passing the vapors through a purifying chamber which contains titanium metal in a form capable of providing a large reaction surface wherein the vaporized impurities are removed by adsorption and reaction with said titanium. For successful operation, it is necessary to maintain the purifying chamber at temperature above the condensation temperature of the selected metal. In this chamber, vaporized impurities react with titanium metal to produce primarily titanium oxide and titanium carbide. The products of this reaction remain in the chamber and are easily removed. This alternative cannot be employed with aluminum.

Alternatively, the temperature of the purifying chamber may be maintained above the condensation point of the vaporized metal, such as manganese, but below the condensation point of contaminating oxides, carbides, nitrides, and the like, so that such by-products of the main reaction will condense in the purifying chamber and thereby be separated from the metal vapor. The remaining unreacted gaseous elemental metal passes to a cooling chamber that is maintained at a temperature below the condensation temperature of manganese. Here the gaseous metal condenses and is collected on the walls of the chamber. This cooling chamber may be water-cooled or may be cooled by any other suitable means. The alternative cannot be employed with aluminum.

An important feature of the invention is the formation of silicon carbide as a by-product of the thermal decomposition. The silicon carbide thus formed may be easily recovered and recycled as an efficient reducing agent in the first step of preparing a silicide or high-silicon alloy from primary source material.

As an illustration of the results obtainable by the process hereinbefore described, the following descriptions of actual runs are presented; it being understood, however, that such descriptions are included merely for purposes of illustration and not by way of limitation.

*Example I*

An admixture containing 3000 parts by weight of silicomanganese alloy comminuted to pass a 65 mesh screen and comprising 63.2 weight percent manganese, 0.05 weight percent phosphorus and 5.4 weight percent iron, and 768 parts by weight of graphite powder was prepared by ball-milling the constituents for about 2 hours. The final particle size of the mixture was about 100 mesh. The mixture was charged into an induction heated evaporating apparatus. After evacuating substantially all the air in the reaction chamber the mixture was heated rapidly to a temperature of about 1455° C., and held approximately 3 hours at a pressure between 1 to 3 microns of Hg. The furnace was then allowed to cool below red heat and the products were removed and analyzed. The analysis of the metal produced is shown below.

| Element: | Percent by weight |
| --- | --- |
| Carbon | 0.12 |
| Oxygen | 0.41 |
| Hydrogen | 0.0015 |
| Nitrogen | 0.004 |
| Iron | 0.027 |
| Manganese | 99.00 |

*Example II*

An admixture containing 100 parts by weight of particulate aluminum-silicon alloy analyzing 50 weight percent aluminum and 50 weight percent silicon and 24 parts by weight particulate graphite powder was charged into a graphite crucible suspended in a vertical tubular vacuum furnace heated by induction coils. The mixture was rapidly heated to a temperature of about 1650° C. under a pressure of about 1 micron of Hg for a period of one hour. The vapors were condensed. The condensate analyzed about 95.0% by weight aluminum.

*Example III*

An admixture containing 100 parts by weight silico manganese crushed to a particle size of 12 mesh by down and comprising 75.6 weight percent manganese, 18.4 weight percent silicon, 1.3 weight percent carbon and balance iron were mixed with 6.5 parts by weight of carbon, 2 parts by weight of a cereal binder and sufficient water to dampen the admixture. The admixture was pelletized into pellets measuring approximately 2 by 2 by 1 and one half inches and placed in a graphite crucible. The crucible containing the admixture was placed in a vacuum induction furnace and heated to a temperature of about 1600° C. and held there for about 4 hours under an ambient pressure of about 0.025 mm. of Hg. Manganese metal was distilled and collected on a condenser. The metal collected analyzed 0.1 weight percent carbon, 0.02 weight percent silicon, 0.05 weight percent iron and the balance manganese. The yield was about 97.7 percent.

What we claim is:

1. A process for producing at least one of the metals selected from the group consisting of manganese, aluminum, and calcium by vaporization techniques comprising admixing an amount of particulate solid state elemental carbon and at least one particulate, solid state material selected from the group consisting of silicides and silicon alloys of at least one element selected from the group consisting of manganese, aluminum, and calcium, said carbon being present at least in that amount required to stoichiometrically combine with the silicon in said material to form silicon carbide; charging the solid state admixture into a vacuum furnace; evacuating substantially all the gas reactive with said selected metals and heating said admixture in vacuo to a temperature sufficiently high to cause formation of silicon carbide and to produce metal vapor of said selected metal at a pressure in excess of the ambient pressure within said vacuum furnace; maintaining a sufficiently high temperature to sustain vaporization of said selected metal and to maintain metal vapor of said selected metal at least at a pressure in excess of the ambient pressure within said vacuum furnace; conducting at least a portion of said metal vapor to a condensing-zone and condensing said metal vapor to form at least one of said selected metals in substantially pure solid metallic form.

2. The process of claim 1 wherein the elemental carbon is present in amounts up to 25 percent in excess of the amount required to stoichiometrically combine with the silicon in said materials selected from the group consisting of silicides and silicon alloys.

3. A process for producing manganese by vaporization techniques comprising admixing at least one particulate solid state manganese-containing material, said material being selected from the group consisting of silicides of manganese and manganese-silicon alloys and an amount of particulate solid state elemental carbon at least in that amount stoichiometrically required to combine with the silicon in said material to form silicon carbide; charging the solid state admixture into a vacuum furnace; evacuating substantially all the gas reactive with said manganese and heating said admixture in vacuo to a temperature between 1450 and 1600 degrees centigrade at a pressure of less than approximately 5.0 microns of Hg and maintaining said temperature for a period of time sufficient to produce substantial vaporization of manganese metal; conducting at least a portion of said manganese vapor to a condensing zone and condensing said manganese vapor to form substantially pure manganese metal.

4. A process for producing aluminum by vaporization techniques comprising admixing at least one particulate solid state aluminum-containing material, said material being selected from the group consisting of silicides of aluminum and aluminum-silicon alloys and an amount of particulate solid state elemental carbon in excess of that amount required to combine with the silicon in said material to form silicon carbide; charging the solid state admixture into a vacuum furnace; evacuating substantially all the gas reactive with said aluminum and heating said admixture in vacuo to a temperature between 1650 and 1700 degrees centigrade at a pressure of less than approximately 5.0 microns of Hg and maintaining said temperature for a period of time sufficient to produce substantial vaporization of aluminum metal; conducting at least a portion of said aluminum vapor to a condensing zone and condensing said aluminum vapor to form substantially pure aluminum metal.

5. A process for producing manganese by vaporization techniques comprising admixing an amount of particulate solid state elemental carbon and at least one particulate, solid state material selected from the group consisting of silicides and silicon alloys of manganese, said carbon being present at least in the amount required to stoichiometrically combine with the silicon in said material to form silicon carbide; charging the solid state admixture into a vacuum furnace; evacuating substantially all the gas reactive with said manganese and heating said admixture in vacuo to a temperature sufficiently high to cause formation of silicon carbide and to produce manganese metal vapor at a pressure in excess of the ambient pressure within said vacuum furnace; maintaining a sufficiently high temperature to sustain metal vapor of said metal at least at a pressure in excess of the ambient pressure within said vacuum furnace; and conducting at least a portion of the purified manganese metal vapors to a condensing zone and condensing said manganese metal vapor to form pure solid metallic manganese.

6. The process of claim 5 wherein said carbon is present in amounts up to 25 percent in excess of the amount required to stoichiometrically combine with the silicon in said material selected from the group consisting of silicides and silicon alloys.

7. A process for producing calcium by vaporization techniques comprising admixing an amount of particulate solid state elemental carbon and at least one particulate, solid state material selected from the group consisting of silicides and silicon alloys of calcium, said carbon being present at least in the amount required to stoichiometrically combine with the silicon in said material to form silicon carbide; charging the solid state admixture into a vacuum furnace; evacuating substantially all the gas reactive with said calcium and heating said admixture in vacuo to a temperature sufficiently high to cause formation of silicon carbide and to produce calcium metal vapor at a pressure in excess of the ambient pressure within said vacuum furnace; maintaining a sufficiently high temperature to sustain metal vapor of said metal at least at a pressure in excess of the ambient pressure within said vacuum furnace; and conducting at least a portion of the purified calcium metal vapors to a condensing zone and condensing said calcium metal vapor to form solid calcium metal.

8. The process of claim 7 wherein said carbon is present in amounts up to 25 percent in excess of the amount required to stoichiometrically combine with the silicon in said material selected from the group consisting of silicides and silicon alloys.

References Cited in the file of this patent

UNITED STATES PATENTS

| | | |
|---|---|---|
| 2,122,446 | Ward | July 5, 1938 |
| 2,637,648 | Udy | May 5, 1953 |
| 2,860,965 | Ruelle et al. | Nov. 18, 1958 |
| 2,965,475 | Wilson | Dec. 20, 1960 |